(12) United States Patent
Imielinski et al.

(10) Patent No.: US 8,713,040 B2
(45) Date of Patent: Apr. 29, 2014

(54) METHOD AND APPARATUS FOR INCREASING QUERY TRAFFIC TO A WEB SITE

(75) Inventors: Tomasz Imielinski, Princeton, NJ (US); Rohit Mittal, Edison, NJ (US); Scot Gregory Zola, Edison, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 1538 days.

(21) Appl. No.: 11/316,759

(22) Filed: Dec. 22, 2005

(65) Prior Publication Data

US 2008/0263003 A1    Oct. 23, 2008

Related U.S. Application Data

(60) Provisional application No. 60/698,299, filed on Jul. 11, 2005.

(51) Int. Cl.
*G06F 7/00* (2006.01)
*G06F 17/30* (2006.01)

(52) U.S. Cl.
USPC .................................................. 707/765

(58) Field of Classification Search
USPC ............................................. 707/1–10, 765
See application file for complete search history.

(56) References Cited

U.S. PATENT DOCUMENTS

2004/0122811 A1* 6/2004 Page .................................. 707/3

* cited by examiner

*Primary Examiner* — Alexey Shmatov
(74) *Attorney, Agent, or Firm* — Stephen M. De Klerk

(57) ABSTRACT

In one embodiment, a method for increasing query traffic to a web site includes providing initial information pertaining to an initial object for presentation to a user, and providing connection information identifying a logical connection between the initial object and one or more additional objects for presentation to the user. The connection information contains data prompting the user to submit a new query concerning one of the additional objects. The method may further include receiving the new query concerning one of the additional objects, and providing a result of the new query to the user.

21 Claims, 12 Drawing Sheets

METHOD AND APPARATUS FOR INCREASING QUERY TRAFFIC TO A WEB SITE

RELATED APPLICATION

The present application claims priority to U.S. Provisional Application Ser. No. 60/698,299, filed Jul. 11, 2005, which is incorporated herein in its entirety.

FIELD

Embodiments of the invention relate generally to search engines, and more specifically to increasing query traffic to a web site.

BACKGROUND

The Internet is now commonly used for commercial purposes. Thus, websites have become an important means for businesses and individuals to transact business and disseminate advertisements about new products and services. Many Internet users who maintain websites carefully monitor the pattern of web browser requests for files or web pages from their website. Typically, a goal of providing a website is to attract a large number of visitors to the website and to motivate the visitors to use the website resources extensively.

SUMMARY

In one embodiment, a method for increasing query traffic to a web site includes providing initial information pertaining to an initial object for presentation to a user, and providing connection information identifying a logical connection between the initial object and one or more additional objects for presentation to the user. The connection information contains data prompting the user to submit a new query concerning one of the additional objects. The method may further include receiving the new query concerning one of the additional objects, and providing a result of the new query to the user.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DESCRIPTION OF EMBODIMENTS

Figure 1:
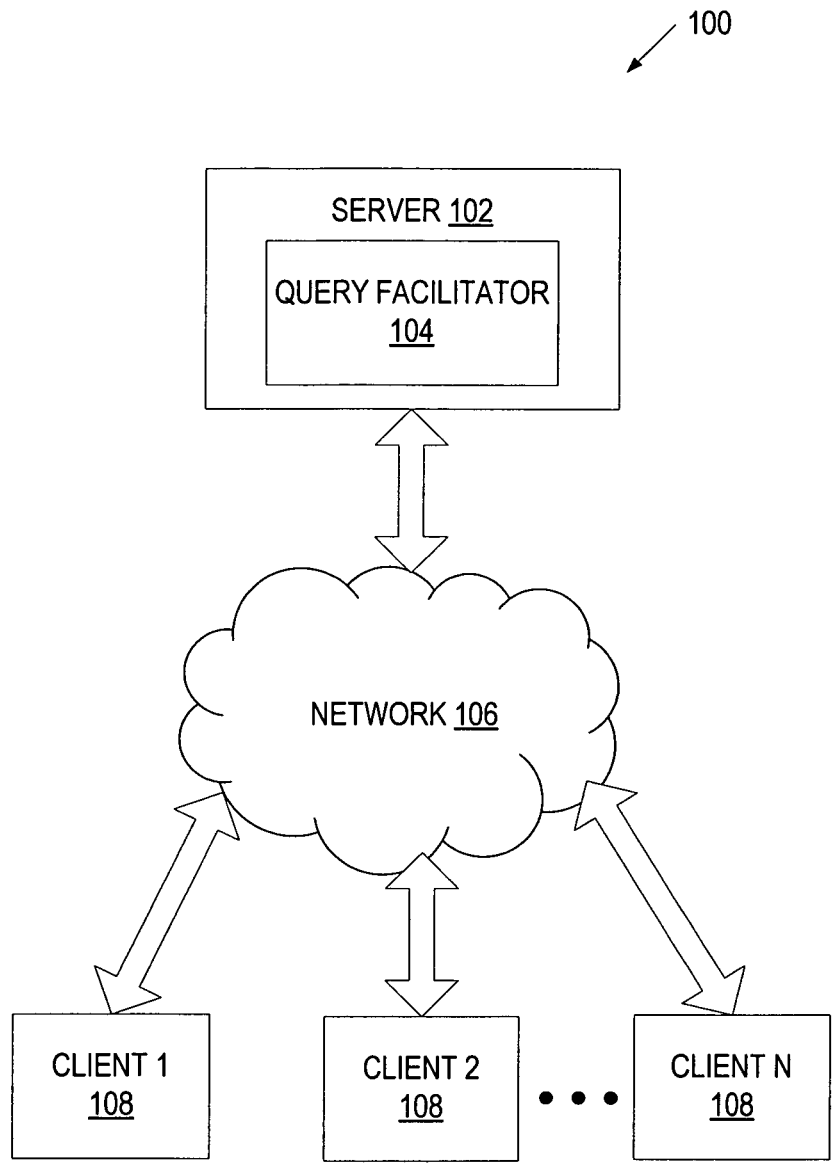
FIG. 1 illustrates a network architecture in which embodiments of the present invention may operate.

A method and apparatus for increasing query traffic to a web site is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe protection of privacy of networked devices containing management subsystems in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

FIG. 1 illustrates an exemplary architecture 100 in which embodiments of the present invention may operate. The architecture 100 may include client devices 108 coupled with a server 102 via a network 106 (e.g., a public network such as the Internet or a private network such as a local area network (LAN)). The client devices 108 may be, for example, personal computers (PCs), mobile phones, palm-sized computing devices, personal digital assistants (PDAs), etc.

The server 102 receives queries about various objects (e.g., products, services, celebrities, universities, etc.) from users of clients 108 when the users visit a web site maintained by the server 102. The server 102 obtains information about desired objects from local databases or other servers, and provides this information to the corresponding clients 108 (e.g., in the form of HTML documents). Each client 108 runs a browser application that displays the received information to the user.

In one embodiment, the server 102 hosts a query facilitator 104 that is responsible for increasing query traffic to the web site maintained by the server 102. In particular, when the query facilitator 104 receives a query about an object from a client 108, the query facilitator 104 obtains information about the object, as well as some connection information that identifies a logical connection between this object and some additional object(s). The query facilitator 104 includes the object information and the connection information into a document (e.g., an HTML document) and transfers this document to the client 108, which then displays it to the user. In one embodiment, the connection information includes data that prompts the user to submit a new query about the additional object.

A discussed above, the connection information identifies a logical connection between the initial object and some additional object(s). The logical connection is a connection that is based on a predefined relationship between the objects, as compared, for example, to a connection based on statistics or a connection based on a similar spelling of object names. In one embodiment, the logical connection is specified using a factoid. A factoid is a statement that makes an object "exceptional" (one of the very few) in a given area. In other words, a factoid indicates special characteristics of an object that logically connect this object to some additional object(s) in the given area. For example, a factoid may be a statement such as "Poland is ranked $7^{th}$ out of 51 in population in Europe." This statement provides a logical connection between Poland and other European countries based on their population. If a user submits a query about Poland, the query facilitator 104 may provide information about Poland along with the above factoid, and allow the user to view a list of countries ranked higher than Poland. Then, if the user selects a country (e.g., Germany) from the list, the query facilitator 104 presents information about Germany, as well as one or more factoids associated with Germany. One exemplary factoid may be "Germany is one of only 4 countries that participated in the introduction of a nuclear power phase-out." The user may then decide to view a list of participating countries and submit a query for one of those countries. This process may be repeated several times, prompting the user to submit multiple queries about different objects.

In another embodiment, a logical connection between the initial object and some additional object is identified using information about common features of the two objects. For example, when a user submits a query about Jack Nicholson, the query facilitator 104 may provide information about Jack Nicholson, along with the question "Do you know what Jack Nicholson and Barbara Streisand have in common?" The user may then receive an answer to this question by clicking on Barbara Streisand. In addition to the answer, the query facilitator 104 may provide information about Barbara Streisand, as well as a new question such as "Would you like to know what Barbara Streisand and Yves Montand have in common?" Again, this process may be repeated several times, prompting the user to submit multiple queries about different objects.

Figure 2:
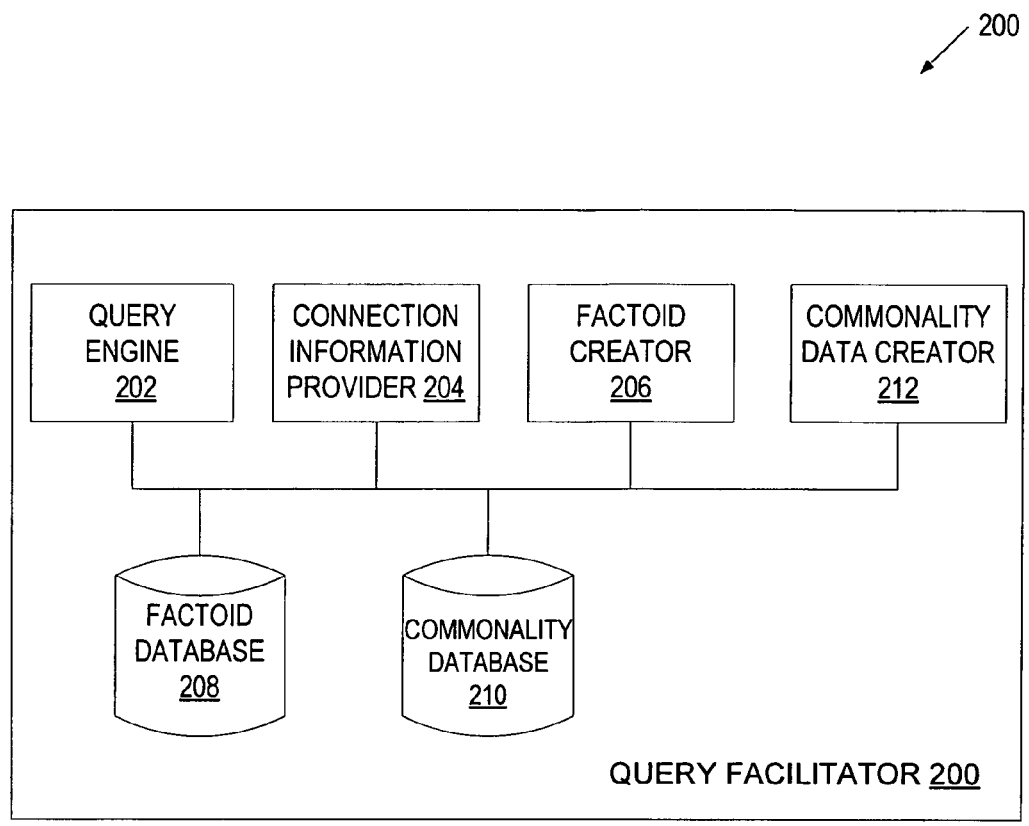
FIG. 2 is a block diagram of one embodiment of a query facilitator.

FIG. 2 is a block diagram of one embodiment of a query facilitator 200. The query facilitator 200 includes a query engine 202, a connection information provider 204, a factoid creator 206, a commonality data creator 212, a factoid database 208 and a commonality database 210.

The query engine 202 is responsible for receiving queries about various objects (e.g., products, services, celebrities, universities, etc.) from different clients, and obtaining information about the objects from local databases or external data sources. In addition, in one embodiment, the query engine 202 invokes the connection information provider 204 to obtain connection information that identifies a logical connection between an object of interest and some additional object(s). The query engine 202 then sends a document (e.g., an HTML document) containing both the object information and the connection information to a corresponding client.

The connection information provider 204 retrieves connection information for an object of interest from a local database. In one embodiment, the connection information is retrieved from the factoid database 208 and includes factoids associated with the object of interest. In another embodiment, the connection information is retrieved from the commonality database 210 and includes commonality data specifying common features of the object of interest and some additional object. In yet another embodiment, the connection information includes a combination of relevant factoids and commonality data.

The factoid creator 206 is responsible for automatically creating factoids for different objects. In one embodiment, the factoid creator 206 maintains different categories of objects and generates factoids for objects within each category using a set of attributes associated with a relevant category. The set of attributes includes numerical attributes and descriptive attributes (referred to as predicates). Numerical attributes define parameters that can be used for comparing objects (e.g., to provide ranking) or ordering objects. Predicates define a field or area in which objects can be compared, ordered or ranked. For example, for cars, a car type (e.g., sedan, sports, etc.) and a car brand (e.g., Toyota, BMW, etc.) are predicates; and a car price, a car power and car popularity are numerical attributes. In one embodiment, the factoid generator 206 generates factoids for an object using a table that stores data describing the object and its attributes.

In one embodiment, the factoid creator 206 can generate factoids of two types: rank factoids and set factoids. A rank factoid provides ranking of an object in a specific area. For example, a rank factoid may state "Object x is in the top (bottom) K objects out of total T object in A that satisfies P," where A is a numerical attribute and P is a combination of one or more predicates. For example, a rank factoid "Poland is ranked 7th out of 51 in population in Europe" includes a numerical attribute "population" and a predicate "Europe" that allows "lifting" Poland to the high ranking in population which otherwise Poland would not achieve (if ranked against all the countries in the world). A set factoid presents an object as a member of a limited set that satisfies one or more predicates. For example, in the set factoid "Joe Schmoe is one of only three infielders in the Hall of fame," the predicate is the conjunction of "infielder" and "Hall of fame." Set factoids may be generated with K as upper bound for the number of elements in the set. Thus, if K=10, then the factoid creator 206 may generate all sets which have less than ten elements and satisfy the predicate.

As will be discussed in more detail below, in one embodiment, the factoid creator 206 iteratively generates factoids for each numerical attribute of an object using various combinations of predicates until the resulting factoid satisfies threshold requirements. The threshold requirements may be satisfied if, for example, the object's numerical characteristic (e.g., ranking or number of members in a set) provided by the factoid is below a threshold, and the number of combined predicates used for generating the factoid is below a threshold. The factoid creator 206 stores factoids satisfying the threshold requirements in the factoid database 208.

The commonality data creator 212 creates commonality data that specifies what objects have in common and stores this commonality data in the commonality database 210. In one embodiment, the commonality data creator 212 creates commonality data for two objects in the form of a 2-set factoid, i.e., a set factoid in which the set is limited to 2 members. An example of a 2-set factoid is "Rutgers and UMASS are the only two universities in North East which are public and which specialize in social sciences."

In another embodiment, objects do not directly share a 2-set factoid but have common features. The commonality data creator 212 determines which objects have common features and stores commonality data identifying the objects and the relevant common features in the commonality database 210. In one embodiment, a common feature defines a direct connection between two objects. For example, a common feature for players X and Y may be their relationship during season S when player X was a coach of player Y. Such a direct connection is referred to as a path of a first degree of separation. In another embodiment, a common feature may be an intermediate entity that defines a connection between two objects. For example, an intermediate entity for players X and Y may be coach A who was a basketball coach for players X and Y together when X and Y played for team T at season S, or an intermediate entity for actors R and P may be cast C for movie M in which actors R and P were casted together. Such a connection is referred to as a path of a second degree of separation. If two intermediate entities are required to connect the objects, such a connection is referred to as a path of a second degree of separation.

In one embodiment, the commonality data creator 212 specifies, for each object (e.g., object A), one or more other objects, which are connected to object A via commonality data, and the commonality data that connects those objects. In one embodiment, the commonality data identifies one or more common features of a pair of objects and specifies a degree of separation between these objects.

Figure 3:
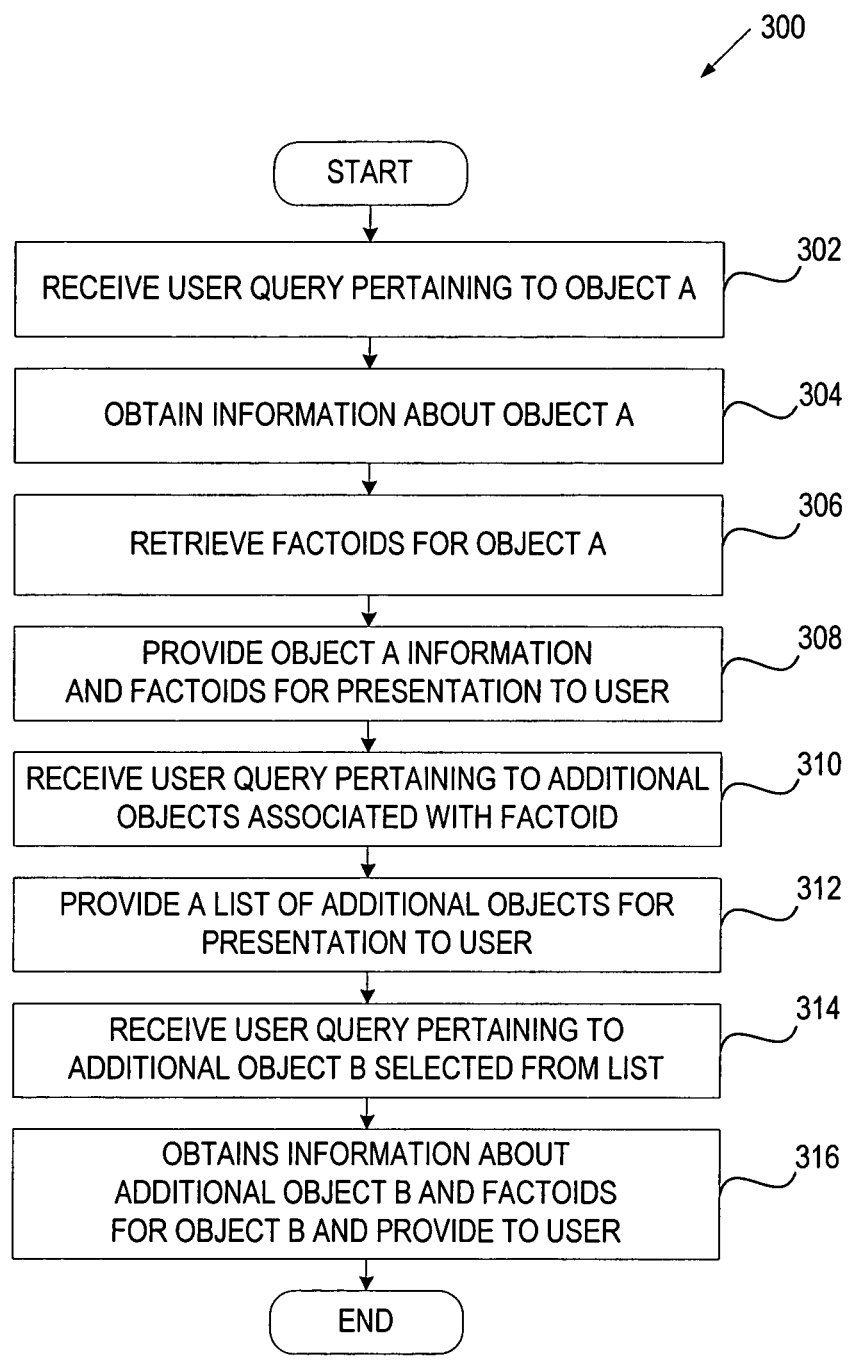
FIG. 3 is a flow diagram of one embodiment of a process for increasing query traffic to a web site using factoids.

FIG. 3 is a flow diagram of one embodiment of a process 300 for increasing query traffic to a web site using factoids. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by a query facilitator 104 of FIG. 1.

Referring to FIG. 3, process 300 begins with processing logic receiving a user query pertaining to object A from a client (block 302). Object A may be, for example, a product, a service, a celebrity, a university, a city, a country, etc.

At block 304, processing logic obtains information about object A from a local database or an external data source (e.g., a content server).

At block 306, processing logic retrieves factoids associated with object A from a local database. In one embodiment, a factoid includes a numerical characteristic that indicates exceptionality of object A in a given area, as compared to some other objects. In one embodiment, processing logic retrieves the information about object A and the factoids from the same local database at the same time. In another embodiment, processing logic retrieves the information about object A and the factoids from different data sources. One embodiment of a process for generating factoids for object A will be discussed in more detail below in conjunction with FIG. 6.

At block 308, processing logic provides the information about object A and the factoids associated with object A to the client for presentation to the user. In one embodiment, processing logic generates a user interface (UI) that includes two areas: a main area for presenting the information for object A and a supplemental area for presenting the factoids for object A. The supplemental area may also provide the user with an option to view additional objects connected to object A via one of the factoids. For example, the supplemental area may display one of the factoids and offer the user to view additional objects covered by this factoid (e.g., by providing a link to the list of additional objects).

Figure 4A:
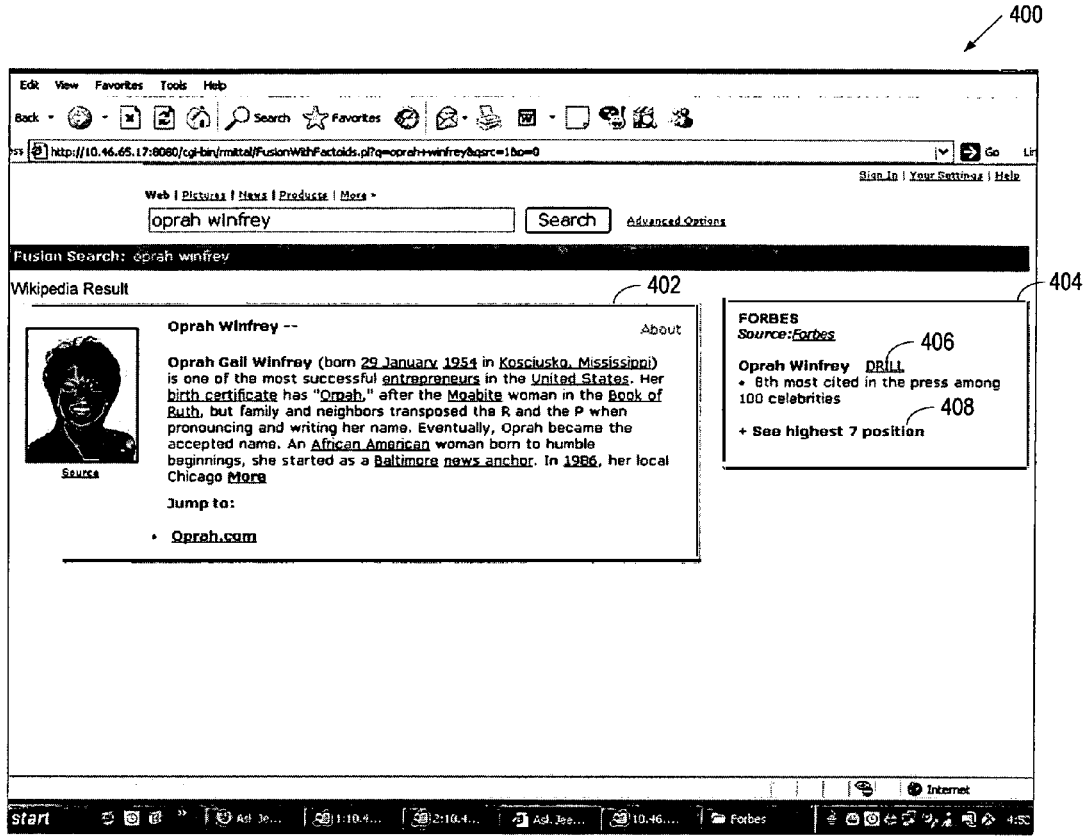
FIGS. 4A-4D show exemplary UIs used for presentation of factoids.
Figure 4B:
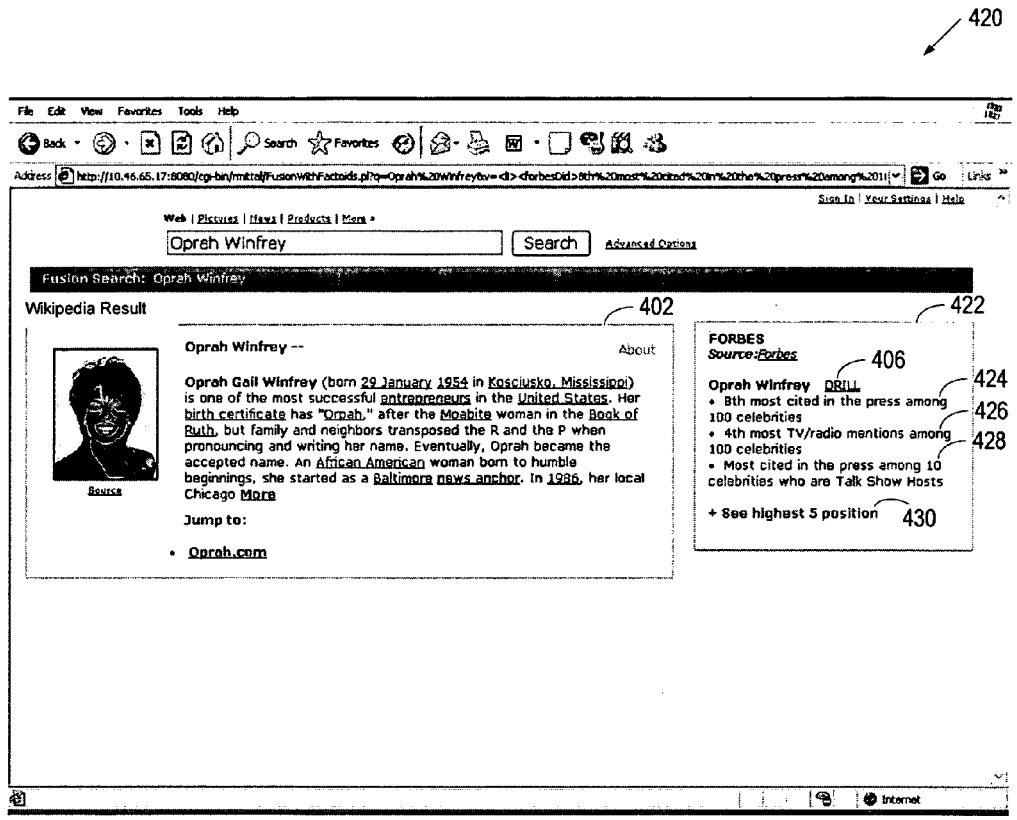

FIGS. 4A and 4B show exemplary UIs that present factoids to a user. Referring to FIG. 4A, UI 400 includes a main area 402 and a supplemental area 404. The main area 402 includes information about Oprah Winfrey, and the supplemental area 404 includes a factoid stating that Oprah is $8^{th}$ most cited in the press among 100 celebrities. The supplemental area 404 also includes data 408 that prompts the user to view other celebrities that are ranked higher than Oprah. In addition, the supplemental area 404 provides an option (referred to as "drill") 406 that allows the user to view all factoids for Oprah Winfrey. If the user selects the drill option 406, processing logic generates a UI 420 shown in FIG. 4B. The UI 420 includes a supplemental area 422 displaying a list of factoids 424 through 428 and data 430 prompting the user to view 5 highest ranked celebrities in the area specified by factoid 428 (shown in red).

Returning to FIG. 3, at block 310, processing logic receives a user query pertaining to additional objects covered by one of the factoids associated with object A. The user query may be submitted if the user selects an option to view additional objects connected to object A via one of the factoids (e.g., option 408 in FIG. 4A or option 430 in FIG. 4B).

Figure 4C:
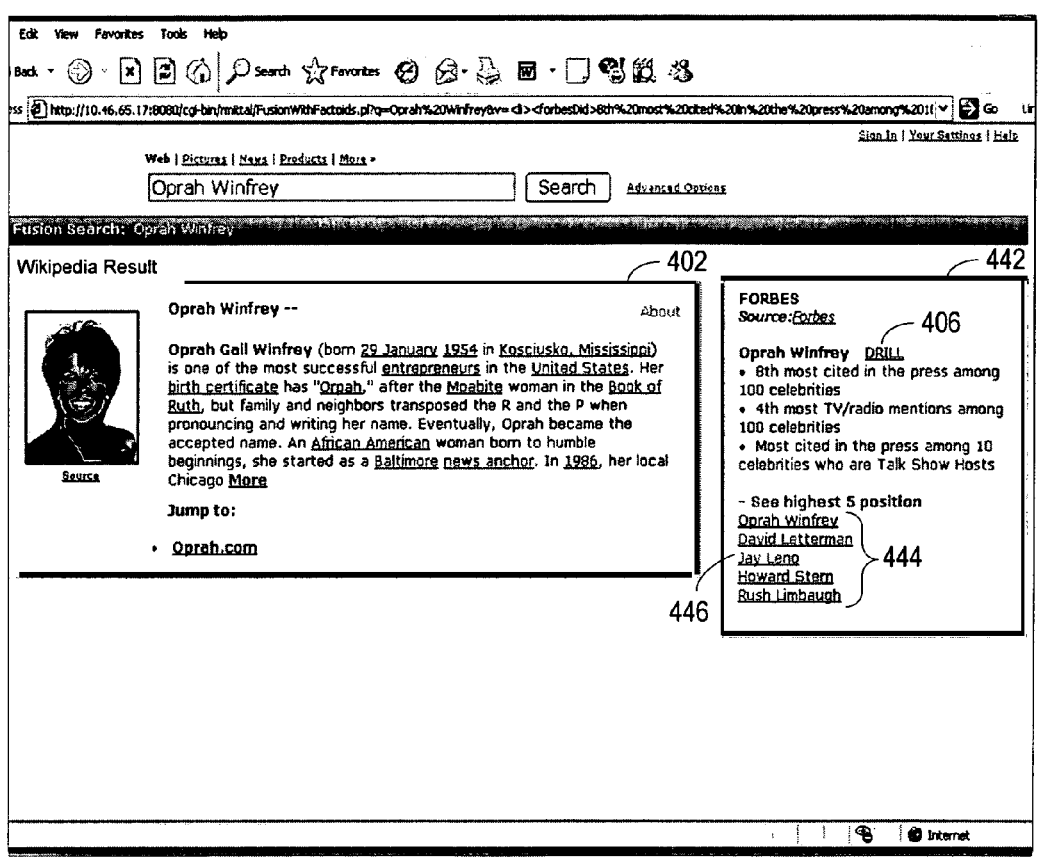

At block 312, processing logic generates a UI providing a list of additional objects to the user. An exemplary UI 440 presenting a list of additional objects to the user is shown in FIG. 4C. UI 440 includes a supplemental area 404 that displays a list of 5 highest-ranked celebrities who are Talk Show Hosts as specified by the last factoid in the list. The user can then select a celebrity (e.g., Jay Leno 446) from the list to submit the query about the selected celebrity.

Figure 4D:
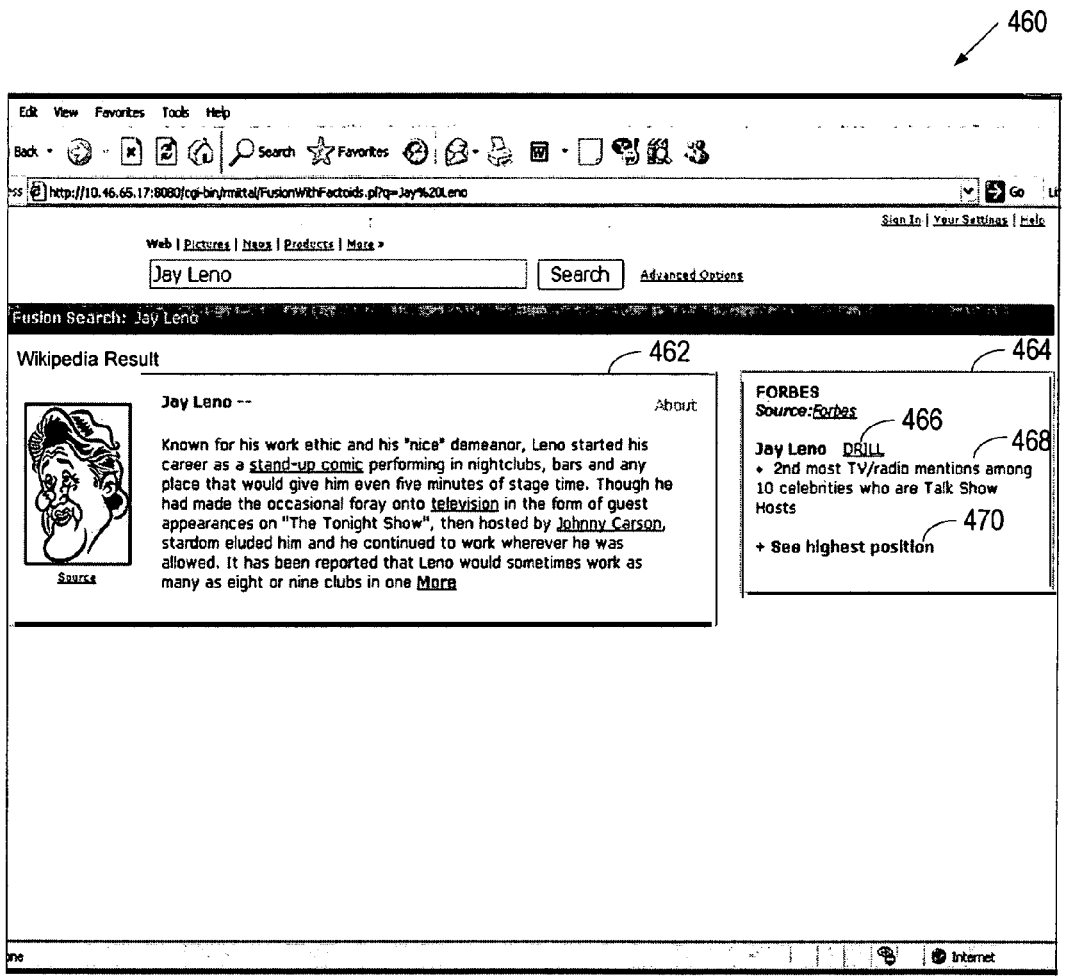

Returning to FIG. 3, at block 314, processing logic receives a new user query pertaining to an additional object B selected from the list provided at block 312. In response, processing logic obtains information about object B, as well as factoids associated with object B, and generates a UI to present the object B information and the factoids to the user (block 316). FIG. 4D shows an exemplary UI 460 that includes a main area 462 with information about an additional object (Jay Leno) and a supplemental area 404 with a factoid 468 for Jay Leno. The supplemental area 464 also includes data 470 that prompts the user to view a celebrity ranked higher than Jay Leno. In addition, the supplemental area 464 provides a drill option 466 that allows the user to view all factoids for Jay Leno.

Figure 5A:
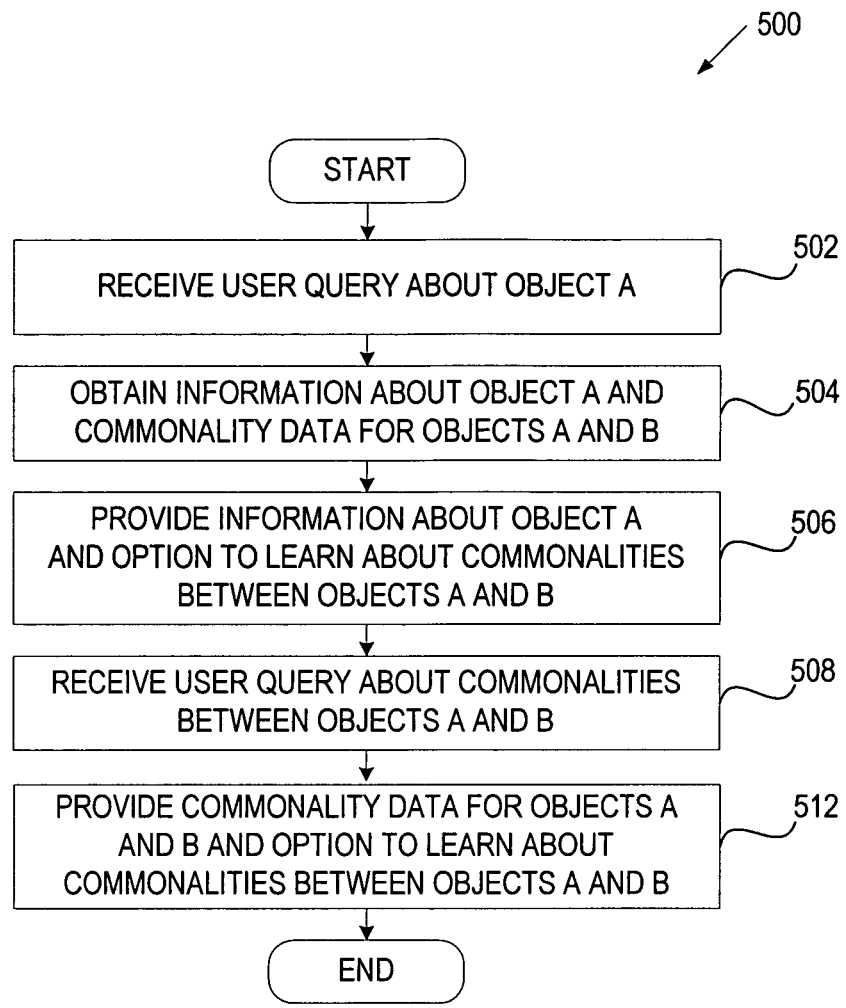
FIG. 5A is a flow diagram of one embodiment of a process for increasing query traffic to a web site using commonality data.

FIG. 5A is a flow diagram of one embodiment of a process 500 for increasing query traffic to a web site using commonality data. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by a query facilitator 104 of FIG. 1.

Referring to FIG. 5A, process 500 begins with processing logic receiving a user query pertaining to object A from a client (block 502). Object A may be, for example, a product, a service, a celebrity, a university, a city, a country, etc.

At block 504, processing logic obtains information about object A and commonality data for objects A and B. The commonality data identifies common features of objects A and B. In one embodiment, the common features of two objects may be defined by a 2-set factoid (a factoid in which the set is limited to 2 members). Then, object B is an object that shares a 2-set factoid with object A. That is, if a function for finding a related object is referred to as SPIN, binary predicate SPIN (a, b) is true if A and B share a 2-set factoid. In another embodiment, a transitive SPIN* is used as transitive closure of SPIN. Using SPIN* increases the coverage of SPIN by including objects that do not directly share any factoids but for which there exists a path from A to B through the SPIN graph. One embodiment of a process for obtaining commonality data for objects is discussed in more detail below in conjunction with FIG. 5B.

At block 506, processing logic provides information about object A to the client. In addition, processing logic provides an option to learn about common features of object A and object B. In one embodiment, processing logic generates a UI that includes information about object A and data prompting the user to learn about commonalities of objects A and B (e.g., a question "Would you like to know what objects A and B have in common?"). The user may then click on object B to submit a query about commonalities of these two objects.

At block 508, processing logic receives a query about commonalities of objects A and B. In response, at block 512, processing logic provides information about common features of objects A and B, as well as data prompting the user to learn about commonalities between objects B and C (e.g., a question "Would you like to know what objects B and C have in common?"). If the user selects object C, process 500 will continue prompting the user to submit more queries.

Figure 5B:
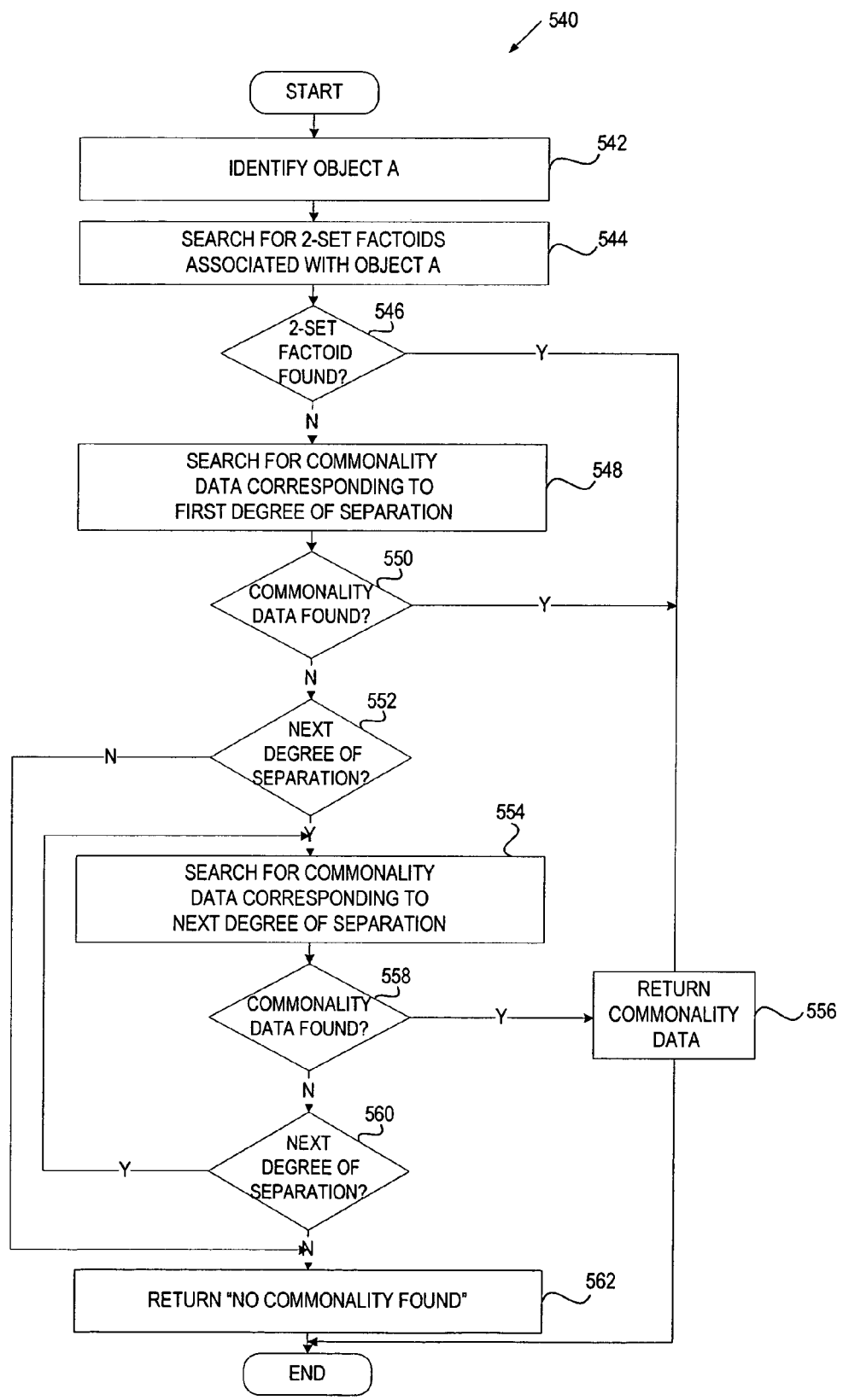
FIG. 5B is a flow diagram of one embodiment of a process for obtaining commonality data.

FIG. 5B is a flow diagram of one embodiment of a process 540 for obtaining commonality data for an object. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 540 is performed by a query facilitator 104 of FIG. 1.

Referring to FIG. 5B, process 540 begins with processing logic identifying object A for which commonality data is to be obtained (block 542). The commonality data identifies common features of object A and some other objects. As discussed above, in one embodiment, the common features of two objects may be defined by a 2-set factoid.

At processing block 544, processing logic searches a database for 2-set factoids associated with object A. If no 2-set factoids are found (block 546), processing logic proceeds to block 548. Otherwise, if any 2-set factoids are found, processing logic returns commonality data (block 556). In one embodiment, if more than one 2-set factoid is found for object A, processing logic selects a random 2-set factoid, extracts data specifying the connection between object A and another object from the selected 2-set factoid, and returns the extracted data. In another embodiment, processing logic selects a 2-set factoid based on a predefined criterion (e.g., a popularity indicator associated with objects related to object A via 2-set factoids, a user profile specifying the user's interest in certain types of objects, etc.).

At block 548, processing logic searches for commonality data that connects object A to another object via a path of length equal to one. The length of a path between two objects is equal to 1 when the connection between the objects is characterized as a first degree of separation, i.e., when the objects have a common feature that defines a direct connection between these objects. For example, a common feature for players X and Y may be their relationship during season S when player X was a coach of player Y.

If commonality data associated with a first degree of separation is not found (block 550), processing logic proceeds to block 552. Otherwise, if such commonality data is found, processing logic returns the commonality data (block 556). In one embodiment, if the commonality data is found for more than one object related to object A, processing logic randomly selects one of the related objects and returns commonality data connecting object A and the selected object. In another embodiment, processing logic selects the related object based on a predefined criterion (e.g., a popularity indicator associated with the related object, a user profile specifying the user's interest in certain types of objects, etc.).

At block 552, processing logic determines whether the database stores commonality data of a next degree of separation (e.g., a second degree of separation) for object A. If not, processing logic returns data indicating that no commonality data has been found for object A (block 562). If so, processing logic searches the database for commonality data associated with the next degree of separation for object A (block 554). If commonality data associated with the next degree of separation is not found (block 558), processing logic proceeds to block 560. Otherwise, if such commonality data is found, processing logic returns the commonality data (block 556) as discussed above.

At block 560, processing logic determines whether the database stores commonality data of a next degree of separation (e.g., a third degree of separation) for object A. If so, processing returns to block 554. If not, processing logic returns data indicating that no commonality data has been found for object A (block 562).

Figure 6:
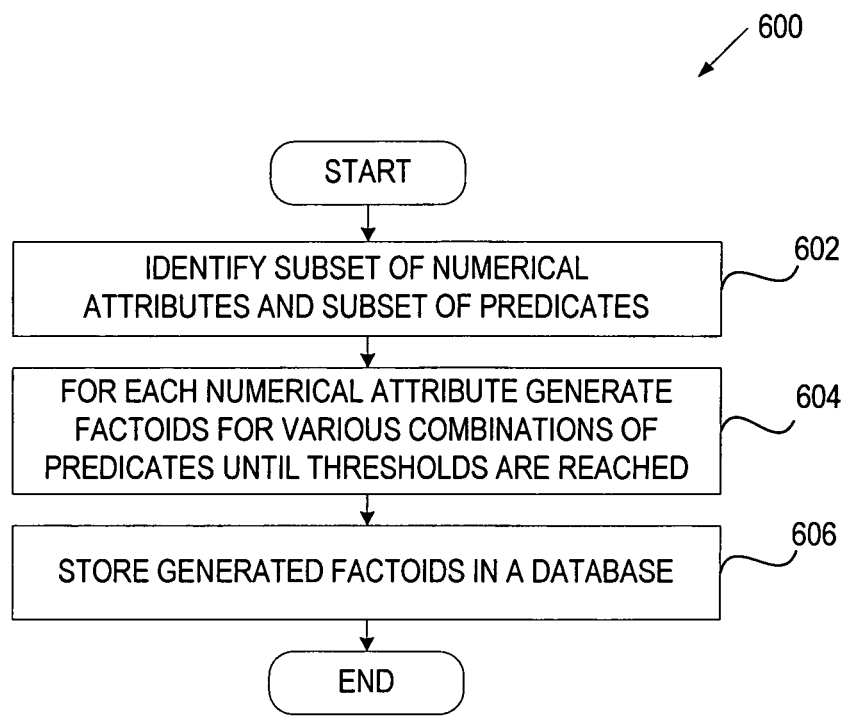
FIGS. 6 and 7 are flow diagrams of a process for generating factoids for an object, according to some embodiments of the present invention.
Figure 7:
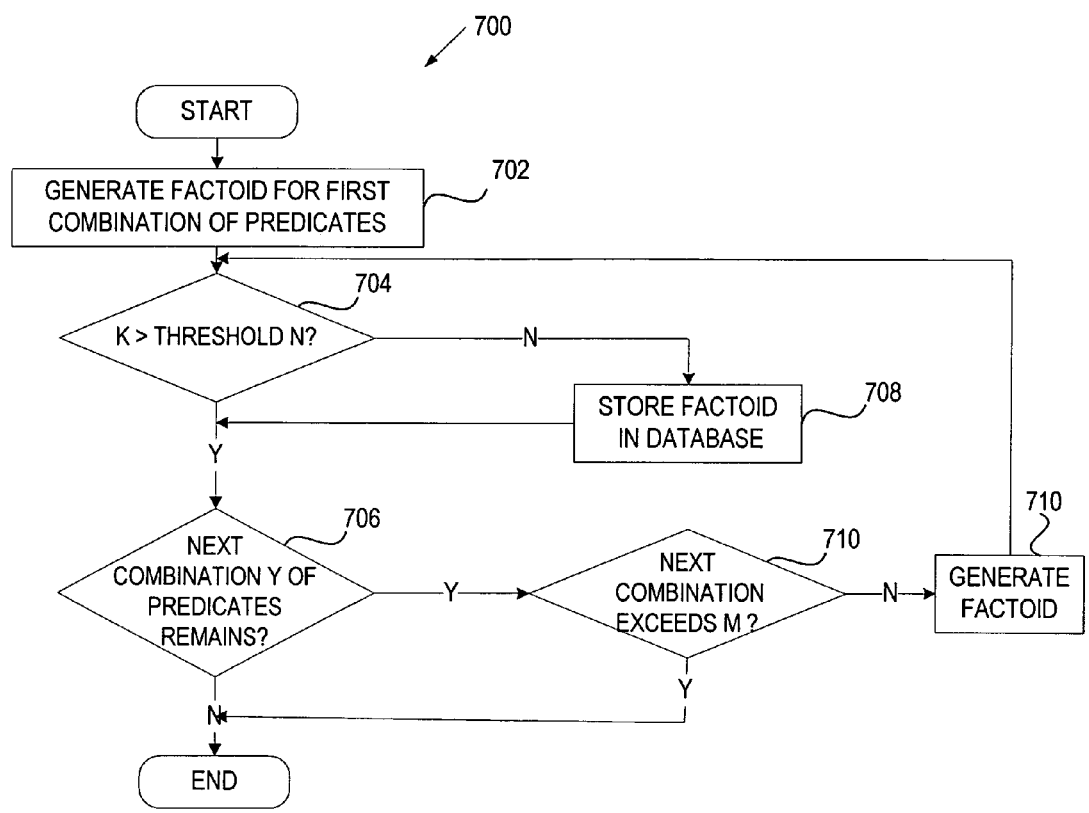

FIGS. 6 and 7 are flow diagrams of a process for generating factoids for an object, according to some embodiments of the present invention. The process may be performed by processing logic that may comprise hardware (e.g., circuitry, dedicated logic, programmable logic, microcode, etc.), software (such as that run on a general purpose computer system or a dedicated machine), or a combination of both. In one embodiment, the factoid generation process is performed by a query facilitator 104 of FIG. 1.

Referring to FIG. 6, process 600 begins with processing logic identifying a subset of numerical attributes and a subset of predicates for a category of an object being processed (block 602). As discussed above, numerical attributes define parameters that can be used for comparing objects and for ranking or ordering objects. Predicates define a field or area in which objects can be compared, ordered or ranked. For example, for cars, a car type (e.g., sedan, sports, etc.) and a car brand (e.g., Toyota, BMW, etc.) are predicates; and a car price, a car power and car popularity are numerical attributes. In one embodiment, the numerical attributes and the predicates of the object are stored in a table along with other information about the object.

At block 604, processing logic generates a factoid for each numerical attribute of the object. In particular, processing logic uses a specific numerical attribute to iteratively generate factoids for various combinations of predicates until a resulting factoid satisfies threshold requirements. The threshold requirements may include a requirement that the number of objects covered by the factoid be below an object threshold, and a requirement that the number of predicates combined to produce the factoid be below a predicate threshold.

At block 606, processing logic stores factoids that satisfy the threshold requirements in a factoid database.

Referring to FIG. 7, process 700 illustrates how a factoid for a numerical attribute of an object is generated according to one embodiment of the present invention. Process 700 begins with processing logic generating a factoid for a first combination of predicates (block 702). The first combination may include one or two predicates of the object.

At block 704, processing logic determines if number K of objects covered by the factoid generated at block 702 exceeds threshold N. If the factoid is a rank factoid, number K may be the ranking of the object. Alternatively, if the factoid is a set factoid, number K may be the number of members in the set to which the object belongs. Threshold N may be relatively small (e.g., 10 or less) to make the object "exceptional" (one of the very few).

If K does not exceed N, processing logic stores the factoid in the database (block 708). Alternatively, processing logic determines if any other combination of the object's predicates remains (block 706). If no other combination remains, process 700 ends. If any other combination remains, processing logic proceeds to a next combination and determines whether the number of predicates in the next combination exceeds threshold M (block 710). If so, process 700 ends. If not, processing logic generates a factoid using the next combination (block 710) and proceeds to block 704.

Figure 8:
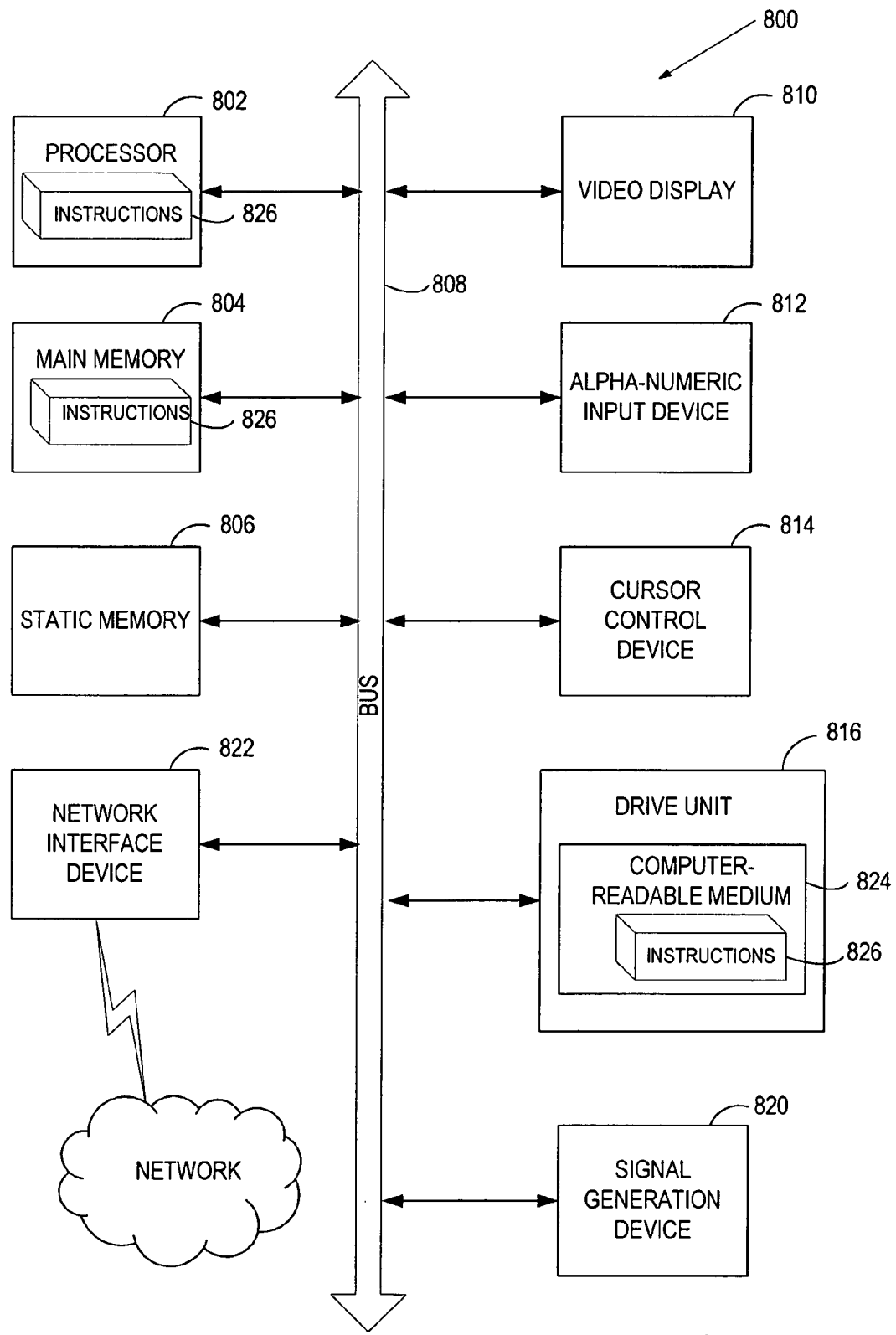
FIG. 8 is a block diagram of one embodiment of a computer system.

FIG. 8 shows a diagrammatic representation of machine in the exemplary form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802 (e.g., a central processing unit (CPU), a graphics processing unit (GPU) or both), a main memory 804 (e.g., read only memory (ROM), flash memory, dynamic random access memory (DRAM) such as synchronous DRAM (SDRAM) or Rambus DRAM (RDRAM), etc.) and a static memory 806 (e.g., flash memory, static random access memory (SRAM), etc.), which communicate with each other via a bus 808.

The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 820 (e.g., a speaker) and a network interface device 822.

The disk drive unit 816 includes a machine-readable medium 824 on which is stored one or more sets of instructions (e.g., software 826) embodying any one or more of the methodologies or functions described herein. The software 826 may also reside, completely or at least partially, within the main memory 804 and/or within the processor 802 during execution thereof by the computer system 800, the main memory 804 and the processor 802 also constituting machine-readable media.

The software 826 may further be transmitted or received over a network 828 via the network interface device 822.

While the machine-readable medium 824 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and apparatus for increasing query traffic to a web site have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computerized method comprising:
   receiving a first query including one or more search terms at a computer system;
   identifying an initial object using the one or more search terms;
   retrieving a predefined relationship between the initial object and an additional object from a database, the predefined relationship comprises one or more attributes that describe the initial object and the additional object;
   generating a common feature about the initial object, the additional object, and the predefined relationship, wherein the common feature comprises information about the one or more attributes; and sending information for presentation to a user of results of the first query pertaining to the initial object, information for presentation of the common feature about the initial object, the additional object and a category in response to the first query, and information for presentation of a search result for a second query received by the computer system, the second query including one or more search terms based upon the common feature, the search result for the second query comprising the additional object.

2. The method of claim 1 wherein:
the predefined relationship is specified using one or more factoids for the initial object, each &the factoids providing a numerical characteristic indicating exceptionality of the initial object in a distinct area; and
sending data for presentation to the user prompting the user to submit a second query comprises a list of one or more additional objects having related numerical characteristics in an area associated with at least one of the factoids.

3. The method of claim 2 wherein:
the second query is a query about an additional object selected by the user from a list: and
a result of the second query is information about the additional object selected by the user.

4. The method of claim 3 further comprising:
providing one or more factoids for the additional object selected by the user, each of the factoids for the additional object specifying a numerical characteristic of the additional object in an area different from areas associated with the factoids for the initial object; and
prompting the user to submit a next query for a new object having logical connection with the additional object, the logical connection being based on one of the factoids for the additional object.

5. The method of claim 2 wherein each entry in the list is a link to information about a corresponding additional object.

6. The method of claim 1 wherein;
the predefined relationship specifies an additional object that has one or more common attributes with the initial object; and
sending data for presentation to the user prompting the user to submit the second query indicates that the user has an option of learning about the common attributes.

7. The method of claim 6 wherein:
the second query is a query about the common attributes of the initial object and the additional object: and
a result of the second query is information about the common attributes of the initial object and the additional object.

8. The method of claim 6 wherein the common attributes are determined using a factoid covering the initial object and the additional object.

9. The method of claim 1 further comprising:
receiving the first query pertaining to the initial object; and
finding the predefined relationship identifying a logical connection between the initial object and the additional objects.

10. An apparatus comprising:
a computer system having a processor and a memory to receive a first query including one or more search terms, receive a second query including one or more search terms, and identify an initial object using the first group of search terms;
a database to store a predefined relationship between an initial object and an additional object, the predefined relationship comprises one or more attributes that describe the initial object and the additional object; and
a query facilitator to generate a common feature about the initial object, the second object, and the predefined relationship, wherein the common feature comprises information about the one or more attributes, the query facilitator to send information for presentation to a user of results of the first query pertaining to the initial object, information for presentation of the common feature about the initial object, the additional object, and a category in response to the first query, and information for presentation of a search result for a second query, the second query including one or more search terms based upon the common feature, the search result for the second query comprising the additional object.

11. The apparatus of claim 10 wherein:
the predefined relationship is specified using one or more factoids for the initial object, each of the factoids providing a numerical characteristic, indicating exceptionality of the initial object in a distinct area; and
sending data for presentation to the user prompting the user to submit a new query comprises a list of the one or more additional objects having related numerical characteristics in an area associated with one of the factoids.

12. The apparatus of claim 11 wherein:
the second query is a query about an additional object selected by the user from the list; and
a result of the second query is information about the additional object selected by the user.

13. The apparatus of claim 12 wherein the query facilitator comprises a predefined relationship provider to provide one or more factoids for the additional object selected by the user, each of the factoids for the additional object specifying a numerical characteristic of the additional object in an area different from areas associated with the factoids for the initial object, and to prompt the user to submit a next query for a new object having a logical connection with the additional object, the logical connection being based on one of the factoids for the additional object.

14. The apparatus of claim 11 wherein each entry in the list is a link to information about a corresponding additional object.

15. The apparatus of claim 10 wherein:
the predefined relationship specifies an additional object that has one or more common attributes with the initial object; and
sending data for presentation to the user prompting the user to submit a second query indicates that the user has an option of learning about the common attributes.

16. The apparatus of claim 15 wherein:
the second query is a query about the common attributes of the initial object and the additional object; and
a result of the second query is information about the common attributes of the initial object and the additional object.

17. The apparatus of claim 15 wherein the common attributes are determined using a factoid covering the initial object and the additional object.

18. The apparatus of claim 10 wherein the query facilitator is to receive the first query pertaining to the initial object, and to find the predefined relationship identifying the logical connection between the initial object and the additional objects.

19. A non-transitory machine-readable medium containing instructions which, when executed by a processing system, cause the processing system to perform a method, the method comprising:
receiving a first query including one or more search terms;
identifying an initial object using the one or more search terms;

retrieving a predefined relationship between the initial object and an additional object from a database, the predefined relationship comprises one or more attributes that describe the initial object and the additional object;

generating a common feature about the initial object, the additional object, and the predefined relationship, the common feature comprises information about the one or more attributes; and sending information for presentation to a user of results of the first query pertaining to the initial object, information for presentation of the common feature about the initial object, the additional object and the a category in response to the first query, and information for presentation of a search result for a received second query, the second query comprising a second group of search terms based upon the common feature, the search result for the second query comprising the additional object.

20. The machine-readable medium of claim 19 wherein:

the predefined relationship is specified using one or more factoids for the initial object, each of the factoids providing a numerical characteristic indicating exceptionality of the initial object in a distinct area; and sending data for presentation to the user prompting the user to submit a second query comprises a list of one or more additional objects having related numerical characteristics in an area associated with one of the factoids.

21. The machine-readable medium of claim 19 wherein:

the predefined relationship specifies an additional object that has one or more common attributes with the initial object; and sending data for presentation to the user prompting the user to submit a second query indicates that the user has an option of learning about the common attributes.

* * * * *